(12) United States Patent
Zhang (10) Patent No.: US 11,517,005 B1
(45) Date of Patent: Dec. 6, 2022

(54) AUTOMATIC JIGGING MACHINES FOR FISHING

(71) Applicant: Xiuming Zhang, Winnipeg (CA)

(72) Inventor: Xiuming Zhang, Winnipeg (CA)

(*) Notice: Subject to any disclaimer, the term of this patent is extended or adjusted under 35 U.S.C. 154(b) by 69 days.

(21) Appl. No.: 17/318,610

(22) Filed: May 12, 2021

(51) Int. Cl.
*A01K 97/12* (2006.01)
*A01K 97/10* (2006.01)

(52) U.S. Cl.
CPC ............ *A01K 97/125* (2013.01); *A01K 97/10* (2013.01)

(58) Field of Classification Search
CPC ........ A01K 97/10; A01K 97/11; A01K 97/12; A01K 97/125
See application file for complete search history.

(56) References Cited

U.S. PATENT DOCUMENTS

| | | | | |
|---|---|---|---|---|
| 5,473,835 A * | 12/1995 | Emett | ................... | A01K 91/065 43/26.1 |
| 6,588,137 B1 * | 7/2003 | Rozkowski | ............ | A01K 97/01 43/17 |
| 8,919,029 B1 * | 12/2014 | Rosocha | ............... | A01K 91/065 43/19.2 |
| 9,179,657 B1 * | 11/2015 | Winter | .................. | A01K 91/065 |
| 10,524,460 B1 * | 1/2020 | Konitzer | ................ | A01K 97/12 |
| 2013/0263493 A1 * | 10/2013 | Morris | ................... | A01K 97/11 43/21 |
| 2021/0352883 A1 * | 11/2021 | Zhu | ......................... | G06F 3/013 |

* cited by examiner

*Primary Examiner* — Richard G Davis
(74) *Attorney, Agent, or Firm* — Kyle R. Satterthwaite; Ryan W. Dupuis; Ade & Company Inc.

(57) ABSTRACT

Automatic jigging machines for fishing purposes each feature a stationary base, and a bending beam load cell by that supports a fishing rod in cantilevered fashion from the base and serves as a bite sensor for detecting a hooked fish, and alerting the user via an alarm function. An electric motor driven in cyclically alternating directions causes automatic jigging of the fishing line, whether through motor-driven reel operation, or through motor-driven tilting of the fishing rod about a pivot point by a screw-based drive mechanism. Where a motorized reel on a removable fishing rod is used for jigging purposes, a manual-override switch is included to enable immediate and convenient manual takeover of the reeling in process by simple grabbing of the fishing rod handle.

17 Claims, 4 Drawing Sheets

AUTOMATIC JIGGING MACHINES FOR FISHING

FIELD OF THE INVENTION

The present invention relates generally to fishing equipment, and more particularly to machines and systems for performing an automated jigging action on a fishing line.

BACKGROUND

In the prior art, various devices have previously been proposed for the purpose of effecting an automated jigging action on a fishing line. Examples of such prior designs include those disclosed in U.S. Pat. No. 3,550,302 of Creviston et al., 4680885 of Lindell et al., and 4779371 of Braud. A commercially available product branded as the DNG C6000i from DNG ehf. of Akureyri, Iceland is a fully automatic fishing machine whose functionality includes self-jigging functions.

Among these, the devices of the prior art can be categorized as those that support a fishing rod in a stationary position, and exert a cyclic action on the fishing line itself to cause the jigging movement thereof (e.g. Creviston); those that instead movably support the fishing rod and impart cyclical movement thereto to impart the jigging action on the fishing line (e.g. Braud); and those that use automated motor-driven rotation of the reel on which the fishing line is wound to impart the jigging action on the line (e.g. Lindell & DNG).

Despite these prior endeavours, there remains room for improved and alternative designs for automatic jigging equipment, and applicant has designed novel jigging machines and systems having novel combinations of features not heretofore seen in the art.

SUMMARY OF THE INVENTION

According to one aspect of the invention, there is provided an automatic jigging system for fishing purposes, said system comprising:

an electric motor attached, or configured for attachment to, a rotatable reel on which a fishing line is wound;

one or more electronic controllers configured to electronically control operation of said electric motor, including at least an automated jigging movement of said fishing line via motor-driven rotation of said reel;

a bending beam load cell operably connected to said one or more electronic controllers;

a rod holder attached to said bending beam load cell in a position supporting, or configured to selectively support, an elongated fishing rod in a cantilevered position from said bending beam load sensor with the fishing line routed through one or more line guides on said fishing rod; and wherein said bending beam load cell is operable to the signal the one or more electronic controllers of detected bending loads exerted on the load cell when a hooked fish pulls on the fishing line and thereby deflects the fishing rod downwardly, whereby the bending beam load cell and the one or more electronic controllers cooperatively detect a bite on the fishing line.

According to another aspect of the invention, there is provided an automatic jigging system for fishing purposes, said system comprising:

an electric motor attached, or configured for attachment to, a rotatable reel that has a fishing line wound thereon and a handle by which said reel is manually rotatable, whereby said electric motor is rotatable both by hand and by said electric motor;

one or more electronic controllers operably connected to said electric motor to electronically control operation of said electric motor, including at least an automated jigging movement of said fishing line via motor-driven rotation of said reel; and a manual-override switch operable to interrupt automated control of the motor by the one or more electronic controllers when manually actuated by a user of the machine to enable manual reeling-in of the hooked fish in non-motorized fashion.

According to yet another aspect of the invention, there is provided an automatic jigging machine for fishing purposes, said machine comprising:

a stationary base;

a control arm supported on stationary base by a pivot point about by which said control arm is pivotable relative to the base in upward and downward fashion about said pivot point;

a rod holder that is carried by said control arm for pivotal movement therewith about said pivot point, and that holds, or is configured to hold, a fishing rod for upward and downward movement therewith said control arm and said rod holder;

a motor-driven screw shaft supported on the stationary base in an upstanding position on an upright axis about which said screw shaft is rotatable in motor-driven fashion; and a displaceable nut engaged with said motor-driven screw shaft in a manner linearly displaceable back and forth along said upright axis via motor-driven rotation of said motor-driven screw in opposing directions; and a coupling by which said control arm is coupled to said displaceable nut, whereby said motor-driven rotation of said motor-driven screw in opposing directions pivots the control arm and the rod holder upwardly and downwardly about said pivot point.

BRIEF DESCRIPTION OF THE DRAWINGS

Preferred embodiments of the invention will now be described in conjunction with the accompanying drawings in which.

DETAILED DESCRIPTION

Figure 1:
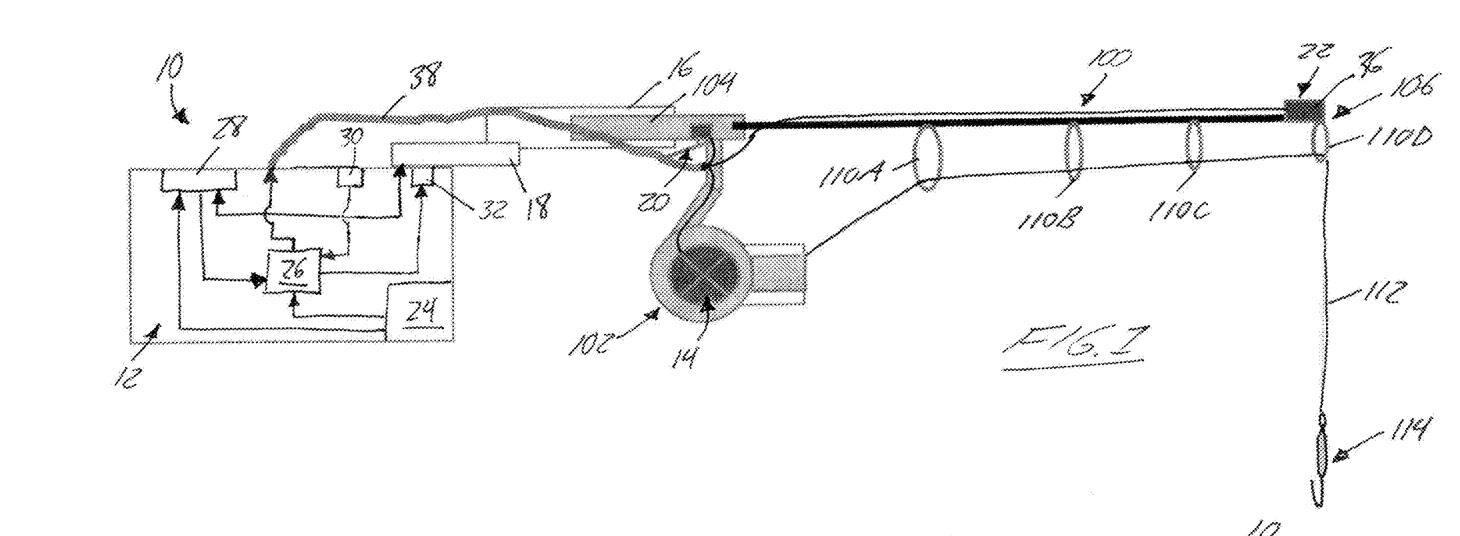
FIG. 1 is a schematic side elevational view of first embodiment automatic jigging machine of the present invention, as viewed from a first side thereof, in a working state thereof having a separate fishing rod installed thereon.
Figure 2:
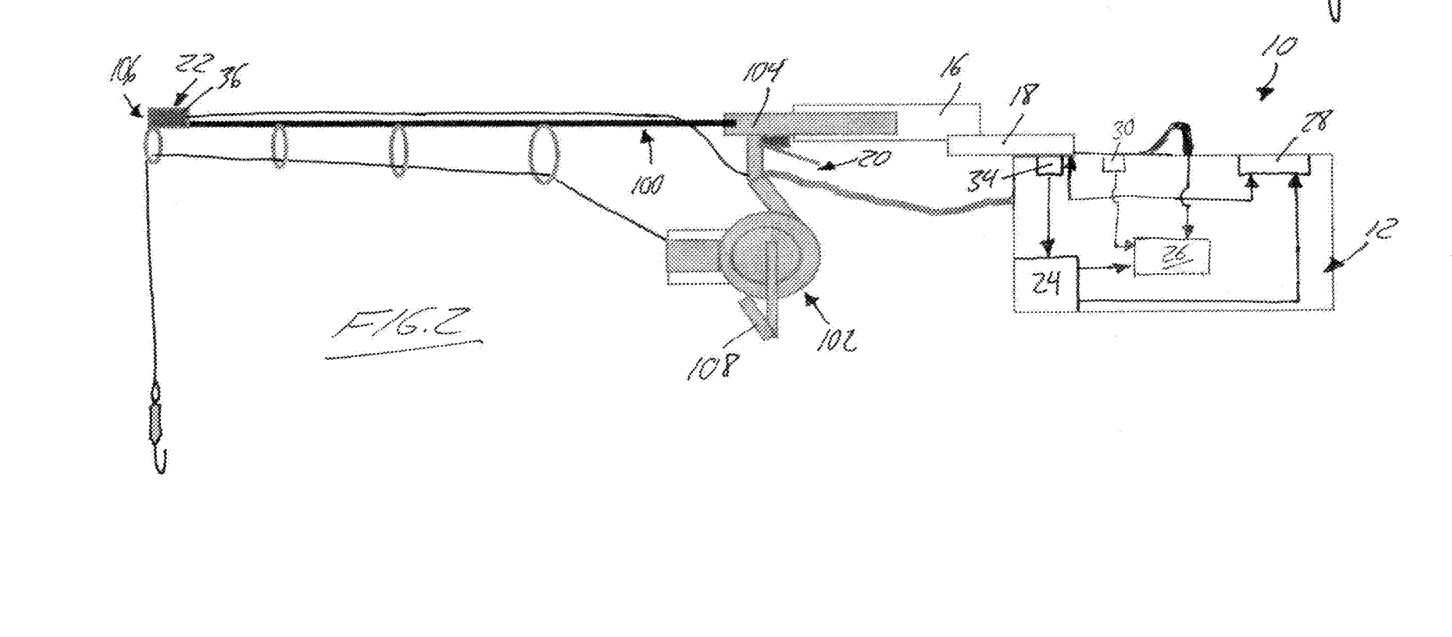
FIG. 2 is another schematic side elevational view of the first embodiment automatic jigging machine in its working state, bur viewed from an opposing second side thereof.

FIGS. 1 and 2 illustrate a first embodiment of an automatic jigging machine 10 designed for compatibility with a user's existing conventional fishing rod 100, and an existing conventional fishing reel 102 mounted thereon. The machine 10 features a base unit 12, a small electric motor 14 attachable to the fishing reel 102 of the fishing rod 100 for motor-driven rotation thereof, a rod holder 16 for receiving and supporting a handle 104 of the fishing rod 100, a bending beam load cell 18 by which the rod holder 16 is supported in cantilevered fashion from the base unit 12, a manual override switch 20 for mounting to the fishing rod 100 at or near the handle 104 thereof, and a line slack sensor 22 for mounting to the fishing rod 100 at or near a distal tip 106 thereof that resides oppositely of the fishing rod's handle 104 in the rod's elongated dimension.

The base unit 12 of the illustrated example is a generally rectangular box-shaped enclosure, the underside of which is restable on the ground or another generally horizontal support surface on which the machine is placed for use. In the context of ice-fishing, the support surface may be the upper ice surface of the frozen-over body of water being fished through a nearby hole drilled through the upper ice. An interior space of the enclosure at least partially houses one or more electrical components of the machine, for example including a rechargeable battery 24; an electronic main controller 26 (e.g. a mini programmable logic controller, or PLC) responsible for automated control of the electric motor 14; a separate dedicated load cell controller 28 for transforming raw signals from the bending beam load cell 18 into suitable input signals usable by the electronic controller for the purposes described herein, if such functionality is lacking in the main controller; and one or more user-input devices forming a user-interface by which user-input is communicable to said electronic controller by a human operator to adjust various operating parameters, switch between different operating modes, and/or trigger various operating functions.

Figure 5:
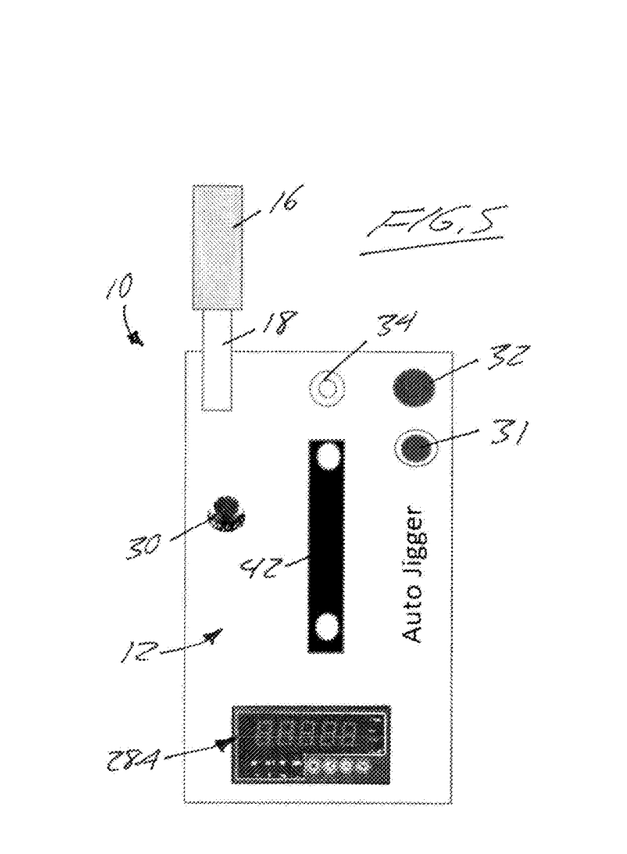
FIG. 5 is a schematic overhead plan view of the first embodiment automatic jigging machine in isolation without a fishing rod installed thereon.

In the illustrated embodiment, exposed actuating portions of these user-input devices all reside in top wall or lid of the enclosure, which thus forms a centralized control panel at which all user-input is effected. With reference to FIG. 5, the user-input devices in this non-limiting example include: a reel speed adjustment device (e.g. rotatable knob) 30, a combined display screen and input panel 28A of the load cell controller 28, and an on/off switch 31 (e.g. pushbutton or toggle). In addition to these user-input devices, the control panel may also feature a visual alarm indicator 32 switchable between different states indicative of normal and alarm conditions (e.g. a light switchable between on and off states, or between illuminated states of different colour and/or pattern, e.g. solid vs. blinking), and a charging jack 34 by which the internal battery is rechargeable without having to open up the enclosure. Any one or more of the user-input devices, alarm indicator 32, and charging jack 34 may optionally relocated to areas of the base unit other than the top wall or lid of the enclosure, without detriment to the purposeful functionality of such relocated components.

The rod holder 16 may be embodied by a tubular housing, for example formed by a short section of cylindrical pipe, that is open at a distal end thereof that is situated furthest, and point away, from the base unit 12, whereby the handle 104 of the fishing rod 100 is insertable into a hollow interior of the rod holder 16 through this open distal end, placing the fishing rod 100 in a suitable working position reaching axially outward from the rod holder and longitudinally away from the base unit 12, thus placing the distal tip 106 of at a notably spaced distance from the base unit. In the drawings, the rod holder 16 and the fishing rod 100 are shown in horizontal orientations, but it will be appreciated that they may alternatively be oriented in inclined fashion of upward slope toward the rod's distal end to better prevent the fishing rod handle from slipping out of the rod holder. Various means of anchoring the fishing rod handle to the rod holder, once inserted therein, may optionally be employed to ensure confident retention of the fishing rod 100 in its inserted working position.

Figure 3:
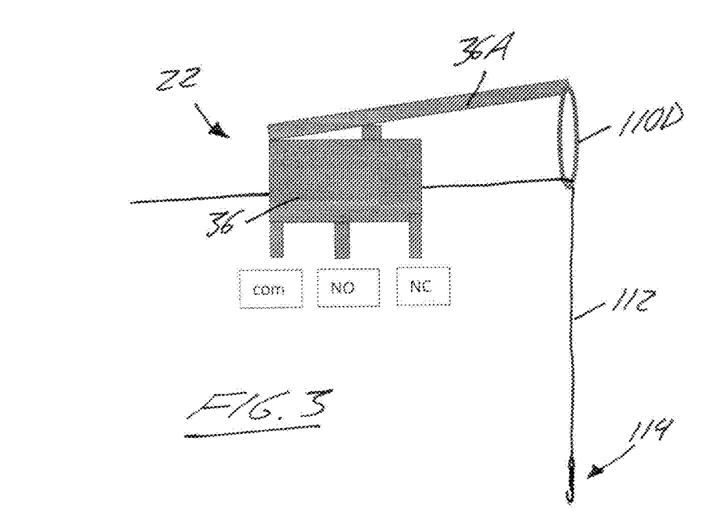
FIG. 3 is an isolated schematic closeup of a line slack sensor of the first embodiment automatic jigging machine, which is used for bottom sensing of the fishing line.

In the working position of the fishing rod 100, the existing reel 102 thereof hangs downward from the fishing rod 100 just outside the open distal end of the rod holder 16, as shown in FIGS. 1 and 2. The manual override switch 20 is installed on the fishing rod 100 on or near the handle 102 thereof at a position that resides outside the rod holder 16 past the open distal end thereof in the rod's inserted working position. The electric motor 14 is installed on the existing reel 102 of the fishing rod on a side thereof opposite an existing crank handle 108 of the reel, by which the reel is manually rotatable. Positioned oppositely of the crank handle 108, the electric motor 14 is of non-interfering relation to the manual accessibility of the crank handle 108. The line slack sensor 22 is installed on the fishing rod 100 at or near the distal tip 106 thereof. In conventional fashion, the fishing rod preferably features a series of line guides 110A-110D hanging from an underside of the rod at spaced intervals therealong between the hanging reel 102 and the distal tip 106 of the fishing rod 100, and the fishing line 112 wound on the reel 102 is routed through this series of line guides 110A-110D. The final line guide 110D nearest to the distal tip 106 of the fishing rod is not affixed directly to the rod in conventional fashion, and instead is affixed to an actuating lever 36A of a micro switch 36, whereby this micro-switch 38 and the attached line guide 110D cooperatively form the line slack sensor 22. Other than this modification of the fishing rod 100 to replace the conventionally affixed final line guide with a switch-carried final line guide, and the securement of the manual override switch 20 at or near the handle 104, the fishing rod remains in its original form.

Figure 4:
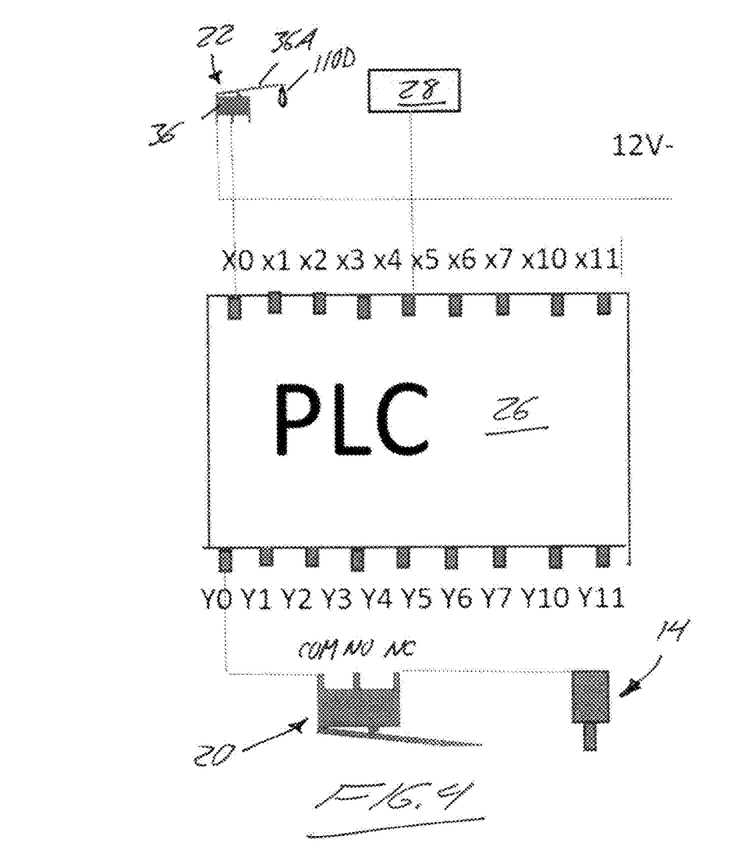
FIG. 4 is a basic circuit diagram of electronic componentry of the first embodiment automatic jigging machine.

A flexible connection cable 38 of the machine contains a bundled set of wires that, inside the base unit 12, are wired to terminals of the main controller 26. The cable 36 extends externally from the base unit 12 past the load sensor 18 and rod holder 16 to join up with the fishing rod 100 or reel 102 at or near where the reel hangs downward from the rod at or near the handle and just outside the open distal end of the rod holder 16. Here, the manual override switch 20 is wired in series between the electric motor 14 and a respective output terminal of the main controller 26, with a common pin of the manual override switch 20 wired to the output terminal of the main controller via a respective wire of the bundled cable 38, and the normally closed pin of the manual override switch 20 wired to the electric motor 14.

Accordingly, by default, the motor 14 is electrically connected to the output terminal of the main controller to receive drive signals therefrom, but when the manual override switch 14 is depressed into its actuated state, thus breaking the connection between the common and normally closed pins of the switch, the motor is electrically disconnected from the main controller, thus interrupting communication of drive signals to the motor, causing termination of the motor's operation. Therefore, upon manual grasping of the handle of the fishing rod in a fashion depressing the manual override switch, any motor operation being executed by a control routine of the main controller is immediately terminated, whereby the reel is no longer in a motor-driven mode, and instead is in a purely manual mode where any desired rotation of the reel must be performed manually via the reel's crank handle 108. Accordingly, at any time, a user can manually grab the handle 104 of the fishing rod in one hand and pull the fishing rod out of the rod holder 16, and depress the manual override switch 20 using the same hand during this grasping and manipulation of the handle, which will automatically place the fishing reel in manual mode for manually driven reel operation via operation of the crank handle 108 by the user's other hand. The user thus has convenient ability to easily take over manual operation of the fishing rod from the prior automated operation by the machine, for example to reel in a hooked fish in manually driven fashion.

The cable 38 is made intentionally long to have notable slack therein when the fishing rod is held in the machine-supported working position by the rod holder, so that when the fishing rod is manually removed, the excess cable length allows the operator freedom of movement to use the fishing rod in positions of varying stature (seated, crouching, standing, etc.) within a limited distance range of the base unit to which the reel-mounted motor, and rod mounted bite and line slack sensors remain connected. In alternate embodiments, wireless communications between the base unit and the rod and reel mounted components may alternatively be employed for even greater freedom of movement relative to the base unit when the rod is removed for manual operation.

Referring again to the cable 38, the slack sensor wiring destined for the line slack sensor 22 branches off from the wiring of the manual override switch 20 and motor 14, and continues further along the fishing rod 100 toward the distal tip 106 thereof to connect to the line slack sensor. In the illustrated example, this slack sensor wiring contains a first wire conductor that connects a common pin of the slack sensor micro switch 36 to a voltage source in the base unit, and a second wire conductor that connects the normally open pin of the micro switch 36 to an input terminal of the main controller. In a spring-biased default position of the switch's actuating lever 36A, the slack sensor input on the main controller 26 lacks it at a low state, i.e. lacks an input signal thereon. When the switch's actuating lever 36A is depressed into its actuated position, the slack sensor input of the main controller is energized to its high state by the voltage source, i.e. the slack sensor input receives an input signal.

The final line guide 110D hangs from the actuating lever 36A such that downwardly pulling of the line guide 110D by downward pulling of fishing line's free end closes the switch 36 into its actuated state. Thus, whenever the fishing line is pulled taught into a tensioned state, the switch 36 is closed into its actuated state, and thus sends an input signal to the main controller. When fishing line is being played out from the reel 102, gravitational fall of the hook and lure 114 at the free end of the fishing line 112 provides such line tension, until the hook and lure 114 reaches the floor (e.g. riverbed, lakebed, seabed) of the body of water being fished (e.g. river, lake sea), whereupon resulting slack in the fishing line causes spring-biased return of the switch 36 to its default (non-actuated) state. The line slack sensor 22 thus serves as a bottom sensor, i.e. a sensor to detect when the fishing line has bottomed out against the floor of the body of water. A steady low signal from the slack sensor is an indicator of this bottomed-out state of the fishing line 112. To avoid false bottom readings, the main controller is preferably programmed to only register a true bottom reading when the low signal remains steady for a time duration exceeding a predetermined threshold.

In addition to the bottom sensor function performed by the line slack sensor 22, the bending beam load cell 18 serves as a bite sensor for detecting when a fish has been hooked on the fishing line 112. A hooked fish pulling on the line will cause the distal tip 106 of the fishing rod 100 to deflect downward, and this downward deflection imparts a bending load on the load cell 18. A threshold sensitivity programmed into the load cell controller is set to an appropriate value that will be exceeding by such pulling of the fishing line by a hooked fish, but not exceeded by the aforementioned gravitational fall of the hook and lure 14 that triggers the high state of the line slack sensor when the fishing line is played out. Accordingly, the load cell controller only sends a bite detection signal to a respective input of the main controller if the threshold sensitivity of the bending beam load cell 18 is exceeded. The threshold sensitivity is preferably user-adjustable, for example via the combined display screen and input panel 28A of the load cell controller 28.

The main controller may be programmed to execute one or more jigging control routines. In each jigging routine, the main controller may start with a line playout subroutine, during which a forward drive signal is sent to the electric motor 14 to drive rotation of the reel 102 in a forward direction playing out the fishing line 112 from the reel, during which the slack sensor input terminal of the main controller is monitored to detection of the bottomed out state of the fishing line 112. The forward drive signal is terminated, denoting end of the line playout subroutine, upon either bottom detection by the line slack sensor 22, or bite by the load cell bite sensor 18. If the line playout subroutine is terminated by bottom detection, then ongoing execution of the jigging routine continues. If the line playout subroutine is terminated by bite detection, then the jigging routine is terminated prematurely, and an alarm and optional reel-in routine is initiated, as described further below.

During continued execution of the jigging routine, first the controller applies a rearward drive signal to the electric motor for a predetermined time duration or rotational distance to reel in the line by a predetermined amount lifting the hook and lure a predetermined distance from the floor of the body of water (setting an intended jigging elevation), and then the controller cyclically applies alternating forward and rearward drive signals of predetermined duration or rotational distance to jig the fishing line repeatedly up and down. Different jigging routines may be executed that vary from one another in such parameters as the jigging elevation, jigging up-stroke distance and/or speed, jigging down-stroke distance and/or speed, delay time between strokes, number of strokes per cycle, number of cycles, and delay time between cycles. Different jigging routines may be preprogrammed, and the main controller may include a suitable user interface (e.g. like the combined display screen and input panel 28A of the separate load controller of the illustrated example) by which user-variation of jigging parameters can entered to derive customized jigging routines based on user preference, operating environment, etc. The illustrated example represents a simplified embodiment, with a singular user adjustment (reel speed) performed via reel speed adjustment knob 30.

During line playout or jigging, a detected bite by the load cell bite sensor 18 causes the main controller to trigger activation of one or more alarm signals, for example at least switching the visual alarm indicator into its alarm state, and optionally also or instead activating an audible alarm device that may also connected to the main controller and triggered thereby in response to the bite detection event, to visually and/or audibly inform the user of the detected bite. Upon being so informed, the user can optionally take over manual operation of the fishing rod and reel, as discussed above. In addition to alarm activation, the main controller may be programmed to perform an automated bite-set function, and/or an automated reel-in function in response to the detected bite. In execution of the bite-set function, the controller applies a high-speed reverse drive signal to the motor for a short duration of time, to pull the line in quickly for a momentary duration to help set the hook in the fish, optionally followed by the reel-in function, where the controller continues driving the motor in the reverse direction to reel in the fish, but at a lower speed than the initial bite-set stage.

Instead of a two-stage process of initial high speed reverse rotation for bite setting, followed by lower speed reverse rotation for subsequent reel-in, the controller may omit the high-speed bite setting stage, and just perform an automated reel-in function in response to the bite detection event. Either way, by triggering automated reel-in simultaneously or concurrently with alarm activation, the machine attempts to the notify the user of the bite on the line so that the user can decide whether to take over the reeling in of the fish in manual fashion, yet initiates automated reel-in to minimize the chance of the fish getting away, whether or not the user sees/hears the alarm, and/or chooses to manually intervene.

While the forgoing description describes the fishing rod 100 as being a user's own existing fishing rod and reel that are retrofitted for compatibility with the machine by end-user or service-provider installation of the manual override switch 20, line slack sensor 22 and electric motor 14 onto the existing fishing gear, it will be appreciated that the removable fishing rod 100 may instead be one that is factory equipped with these components, and sold as part of a kit or package with the machine. Either way, the same end result is achieved, an equipment setup with an automated jigging action, optional automated bite-setting and/or reel-in actions, and a selectively removable fishing rod with a manual override switch for taking over the reeling in of a caught fish.

The bending beam load cell 18 may be removably attached to the base unit for optional removal therefrom for selective user-mounting thereof to a different support structure, for example to a boat rails or other part of a boat when boat fishing. Meanwhile, the base unit is particularly useful when ice fishing, where the base may simply be seated on the ice near the ice fishing hole, though it of course may be placed atop another object or structure near the hole. The present invention thus encompasses novel use of a bending beam load cell as a bite sensor for a fishing rod supported in cantilevered fashion from the load cell, regardless of what particular structure the load cell is mounted to. Also, while the illustrated embodiment has the manual override switch installed in series between the motor and the main controller to provide electrical/signal disconnection therebetween when actuated, it will be appreciated that the manual override switch may instead be connected to an input of the main controller, the latter of which could be programmed to continually monitor for a change in actuated/non-actuated state of the manual override switch, and to terminate any running motor-control routine upon such detected change in state. Either way, the manual override switch is operable to interrupt automated control of the motor and thereby enable manual takeover of the reeling in process.

Figure 6:
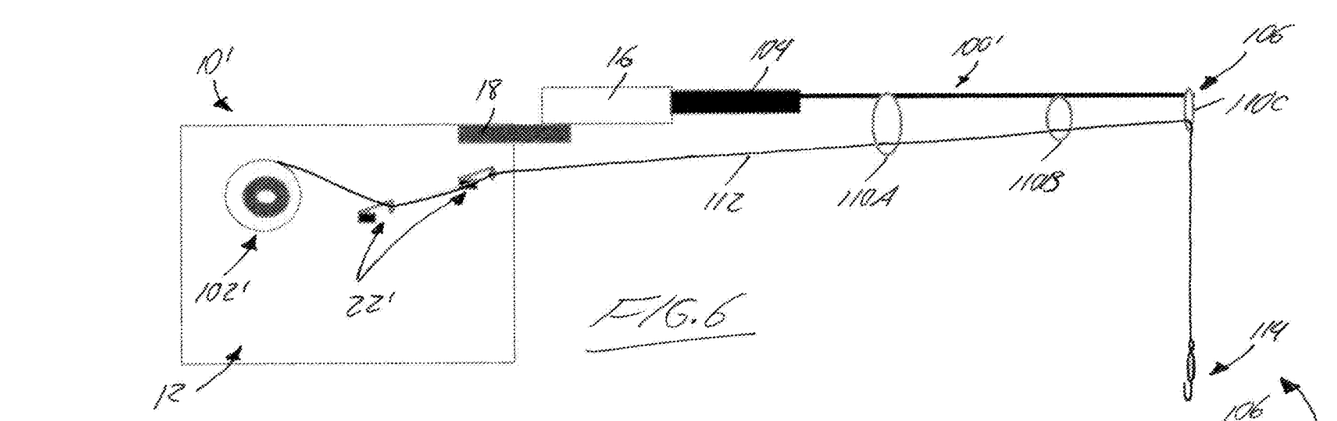
FIG. 6 is a schematic side elevational view of second embodiment automatic jigging machine of the present invention, which has a built in rod and motorized reel.

Turning to FIG. 6, shown therein is a second embodiment automatic jigging machine 10' that lacks a removable fishing rod 100 and attached reel 102 with associated manual override functionality. Instead, the machine 10' in this alternate embodiment features its own dedicated rod 100' that lacks an on-board reel and manual override switch, and in the illustrated example, also lacks a line slack sensor on the rod 100' itself. In this embodiment, a motorized reel 102' is instead incorporated into the base unit 12 itself. The fishing line 112 wound on this reel 102' is once again routed through one or more line guides 110A-110C on the rod 100', so as to hang from the final line guide 110C at or near the distal tip 106 of the rod 100'. In this illustrated example, this final line guide 110C is a conventional stationary line guide affixed to the rod itself, rather than to a switch serving as a line slack sensor 22. Instead, one or more line status sensors 22' are incorporated into the base unit 12 to monitor conditions of the fishing line (e.g. tensions vs. slack for bottom detection, as above) for the purpose of controlling the motor-driving routines of the main controller 26 that once again controls motor operation in the same or similar fashion to the control routines described above for the first embodiment.

Figure 7:
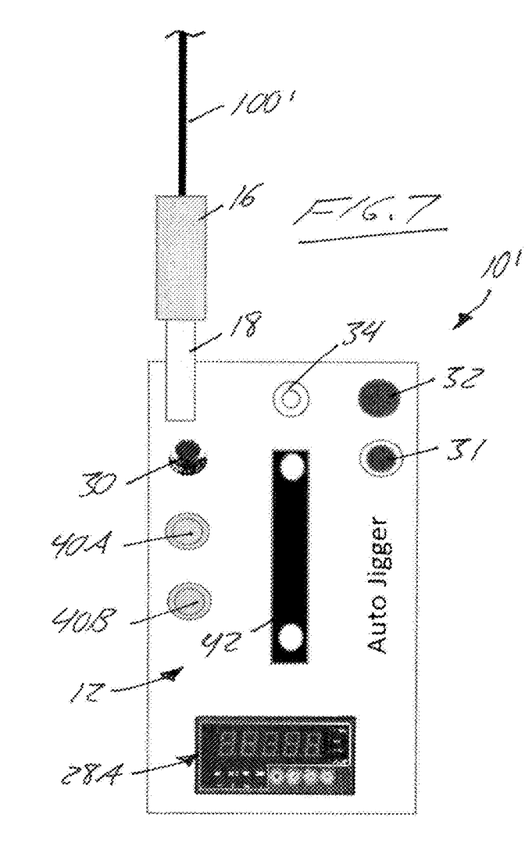
FIG. 7 is a schematic overhead plan view of the second embodiment automatic jigging machine.

Once again, a bending beam load sensor 18 at least partly defines the structure by which the elongated rod 100' is supported in cantilevered fashion from the base unit so as to thereby serve as a functional bite sensor in the same manner described above for the first embodiment. Though descried as a dedicated part of the machine 10', the rod 100' in this embodiment may still be removably supported on the load cell 18, for example by an identical or similar rod holder 16 to that of the first embodiment, whereby selective detachment of the dedicated rod enables collapse of the machine for more compact storage and transport. This embodiment benefits from the same automated jigging, bite-setting and/or reel-in functions as the first embodiment, with the same novel use of a bending beam load cell bite sensor, though without the manual override capability that allows hand-held use of the rod and hand cranking of the rod-attached reel in the first embodiment. The built-in motorized reel in the second embodiment may lack a hand crank altogether, and so with reference to FIG. 7, the user interface of the second embodiment may instead incorporate a pair of rotation control input devices 40A, 40B (e.g. pushbuttons) that are connected to the main controller 26 and respectively operable to perform forward and rearward rotation of the motorized reel 102'. These rotation control input devices 40A, 40B may be located atop the base unit as part of a centralized control panel like that of the first embodiment, or may be repositioned elsewhere on the base unit. In addition to the various descried input devices described above, the base unit in both embodiments preferably also includes a lifting handle 42 at the topside thereof for convenient lifting and carrying of the base unit during transport.

Figure 8:
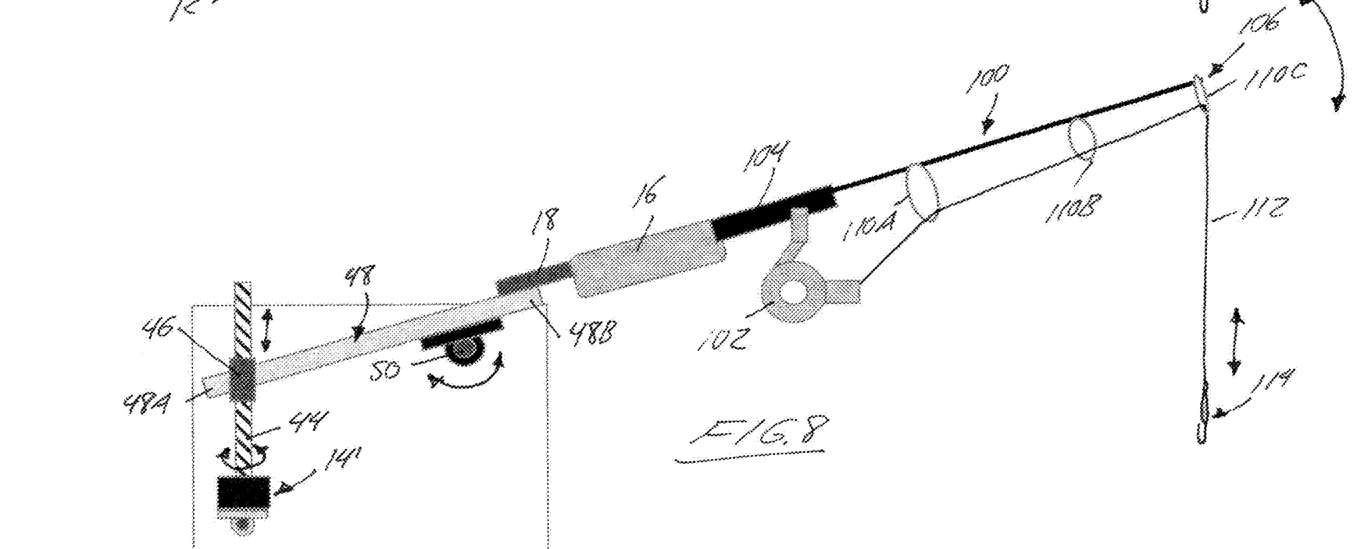
FIG. 8 is a schematic side elevational view of third embodiment automatic jigging machine of the present invention, which instead of employing a motorized reel to impart a self-jigging action on the fishing line wound thereof, uses a screw-based actuator to cyclically tilt the fishing rod up and down to impart the jigging action.

FIG. 8 shows a third embodiment automatic jigging machine 10' that, like the two preceding embodiments, features a stationary base unit 12 for containing the main controller, load cell controller, battery and associated circuitry responsible for performance of an automated self-jigging action of a fishing rod 100 supported in cantilevered fashion from the base unit 12 via a bending beam load cell 18 that serves as a bite sensor. However, in this embodiment, the automated jigging action is not executed via motor-driven operation of the reel 102, and is instead executed via cyclical upward and downward tilting of the fishing rod 100 about a pivot point. The main controller is once again responsible for bi-directional operation of an electric motor 14' to perform the jigging action, but instead of this motor being attached to the reel 102 on which the fishing line 112 is wound, the motor 14' is mounted to the stationary base 12 and drives rotation of an upright screw shaft 44. A displaceable nut 46 is engaged on this motor-driven screw shaft 44, whereby driven rotation of the screw shaft 44 in opposite rotational directions is effectively to displace the nut 46 back and forth along the upright axis of the screw shaft 44. The nut 46 includes or carries a coupling thereon by which a proximal end portion 48A of a control arm 48 is connected to the nut so as to lift and lower this proximal end portion 48A of the control arm 48 along the screw shaft when driven in opposing directions by the motor 14'.

The control arm 48 is pivotably supported on the stationary base by a fulcrum 50 that defines a horizontal pivot axis lying perpendicular to a longitudinal direction in which the fishing rod 100 cantilevers outwardly away from the base unit when supported thereon by the load cell 18 and rod holder 16. The load cell 18 is affixed to the control arm 48 at a distal end portion 48B that resides oppositely of the proximal end portion 28A in this longitudinal direction. The fulcrum 50 resides intermediately between the proximal and distal end portions of the control arm, whereby lifting and lowering of the proximal end portion by the screw shaft rotation respectively cause lowering and raising of the distal end portion. The rod holder 16 and the fishing rod 100 carried thereby are cantilevered off the distal end of the control arm 48 by the bending beam load cell 18, which serves the same bite sensor purpose described above in the other embodiments. The fishing rod 100 features a reel 102 and a set of line guides 110A-110C, the final one 110C of which may be part of the same type of line slack sensor 22 described in the first embodiment for the purpose of detecting the bottomed-out state of the fishing line 112 to trigger initiating of an automated jigging routine. The reel may be of a purely hand-cranked type, or a motorized type for motor-driven bite-setting and/or reel-in capabilities, as described for the first embodiment.

The automated jigging is once again performed by cyclically alternated driving of the motor 14' in opposite directions, in this case causing cyclically alternating displacement of the nut 46 down and back up the screw shaft 44 to cyclically lower and raise the proximal end portion 48A of the control arm 48 in alternating fashion about the fulcrum-defined pivot point 50, which cyclically raises and lowers the distal tip 106 of the fishing rod about the same pivot point 50, thereby jigging the submerged portion of the fishing line 112, and its attached hook and lure 114, up and down in the body of water. The load cell 18 once again serves as the bite sensor that detects the bite of a hooked fish, in response to which the main controller terminates the jigging function and triggers the alarm to notify the user of the bite. So notified, the user can remove the rod 100 from the rod holder 16 for hand-held manipulation of the rod from thereon during the reeling in process, whether performed manually via the crank handle of a manual reel, or in powered fashion via a motorized reel if the rod is so equipped.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An automatic jigging system for fishing purposes, said system comprising:
    an electric motor attached, or configured for attachment to, a rotatable reel on which a fishing line is wound;
    one or more electronic controllers configured to electronically control operation of said electric motor, including at least an automated jigging movement of said fishing line via motor-driven rotation of said reel;
    a bending beam load cell operably connected to said one or more electronic controllers;
    a rod holder attached to said bending beam load cell in a position supporting, or configured to selectively support, an elongated fishing rod in a cantilevered position from said bending beam load sensor with the fishing line routed through one or more line guides on said fishing rod; and
    wherein said bending beam load cell is operable to signal the one or more electronic controllers of detected bending loads exerted on the load cell when a hooked fish pulls on the fishing line and thereby deflects the fishing rod downwardly, whereby the bending beam load cell and the one or more electronic controllers cooperatively detect a bite on the fishing line.

2. The system of claim 1 further comprising a manual-override switch operable to electrically disconnect the motor when manually actuated by a user of the system to enable manual reeling-in of the hooked fish in non-motorized fashion.

3. The system of claim 2 wherein said manual-takeover switch is configured for selective installation thereof onto said fishing rod at or near a handle thereof to enable depression of said manual-takeover switch by a same gripping hand in which a user grasps the handle of the fishing rod.

4. The system of claim 2 comprising said fishing rod, on which said rotatable reel is carried proximate a handle of said fishing rod, and wherein said manual-takeover switch is installed on said fishing rod at or near said handle thereof to enable depression of said manual-takeover switch by a same gripping hand in which a user grasps the handle of the fishing rod.

5. The system of claim 1 further comprising a line slack sensor for detecting bottoming of the fishing line against a floor of a body of water, wherein said line slack sensor is configured for selective installation thereof onto said fishing rod at or near a distal tip thereof.

6. The system of claim 5 wherein said line slack sensor comprises a switch having an actuating lever that carries a final line guide of the fishing rod through which the fishing line departs from the fishing rod.

7. The system of claim 1 comprising said fishing rod, and further comprising a line slack sensor installed on said fishing rod at or near a distal tip thereof for detecting bottoming of the fishing line against a floor of a body of water.

8. The system of claim 1 comprising an alarm indicator in cooperatively installed relationship with the one or more electronic controllers and the bending beam load cell for actuation of said alarm indicator by the detected bite on the fishing line.

9. The system of claim 1 comprising a base unit that carries at least one of the following: at least one of said one or more electronic controllers, an associated user interface via which user-input is communicable to said one or more electronic controllers, and power supply componentry through which said electric motor, said one or more electronic controllers and said associated user interface are powered; wherein said bending beam load cell is attached or attachable to said base unit.

10. The system of claim 9 wherein said bending beam load cell is removably attached or attachable to said base unit, and selectively attachable to an alternative support structure.

11. The system of claim 9 wherein the base unit comprises said user interface, and said user interface includes user input devices operable to perform forward and rearward rotation of the motor.

12. The system of claim 9 wherein the base unit comprises said user interface, and said user interface includes a user input device operable to adjust a threshold sensitivity of the load beam.

13. The system of claim 9 wherein the electric motor and the reel are on-board component of the base unit.

14. The system of claim 13 wherein the base unit comprises one or more load status sensors past which the fishing line is routed, and that are operable to monitor conditions on the fishing line.

15. The system of claim 1 wherein the fishing rod is a dedicated rod that lacking an on-board reel thereon.

16. The system of claim 15 wherein said dedicated fishing rod is configured for selective detachment thereof from the rod holder for collapse of the system to a more compact form for storage or transport.

17. The system of claim 15 wherein the one or more electronic controllers are configured to perform an automated bite-set function after detection of the bite on the fishing line, said automated bite-set function driving the motor in a reverse direction at a first speed for a momentary duration, followed by a reel-in function driving the motor in the reverse direction at a second speed of lower magnitude than said first speed.

* * * * *